(12) United States Patent
Lu

(10) Patent No.: US 7,479,945 B2
(45) Date of Patent: Jan. 20, 2009

(54) WIRELESS MOUSE HAVING RECEIVER RECEPTACLE

(76) Inventor: Hang Lu, 3F, No. 547, Kuang Fu South Road, Hsin I District, Taipei City (TW)

( * ) Notice: Subject to any disclaimer, the term of this patent is extended or adjusted under 35 U.S.C. 154(b) by 621 days.

(21) Appl. No.: 11/144,773

(22) Filed: Jun. 6, 2005

(65) Prior Publication Data

US 2006/0274043 A1 Dec. 7, 2006

(51) Int. Cl.
*G06F 3/033* (2006.01)
(52) U.S. Cl. ....................................................... 345/163
(58) Field of Classification Search .......... 345/163–167
See application file for complete search history.

(56) References Cited

U.S. PATENT DOCUMENTS 6,839,431 B2 * 1/2005 Ooya et al. ............. 379/433.09
6,909,421 B2 * 6/2005 Wang .......................... 345/163
2005/0057506 A1 * 3/2005 Chi ............................. 345/163
2006/0007151 A1 * 1/2006 Ram .......................... 345/163
2006/0114231 A1 * 6/2006 Koh ........................... 345/166

* cited by examiner

*Primary Examiner*—Amr Awad
*Assistant Examiner*—Randal Willis
(74) *Attorney, Agent, or Firm*—Leong C. Lei

(57) ABSTRACT

A wireless mouse having a receptacle for the storage of its wireless receiver is provided. When the wireless mouse is not in use, the wireless receiver could be inserted into a receptacle chamber built in the wireless mouse. An internal mechanism inside the wireless mouse automatically holds the wireless receiver in its position within the receptacle chamber. To remove the wireless receiver, a release button is engaged and the wireless receiver would be released and ejected out of the receptacle chamber.

1 Claim, 4 Drawing Sheets

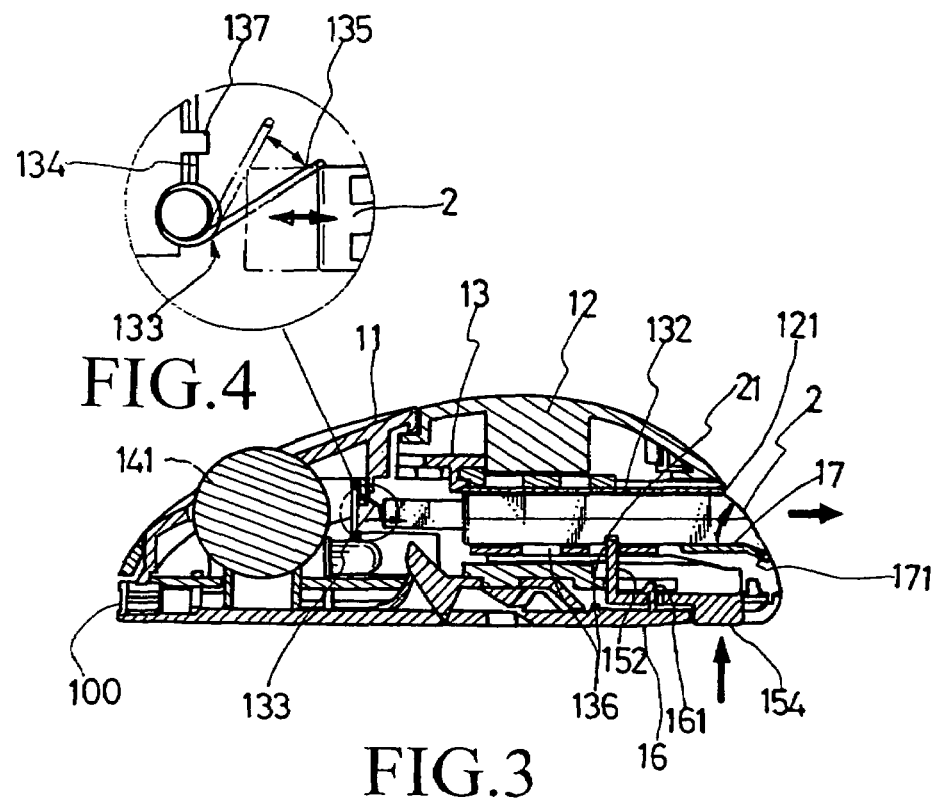
FIG.4
FIG.3
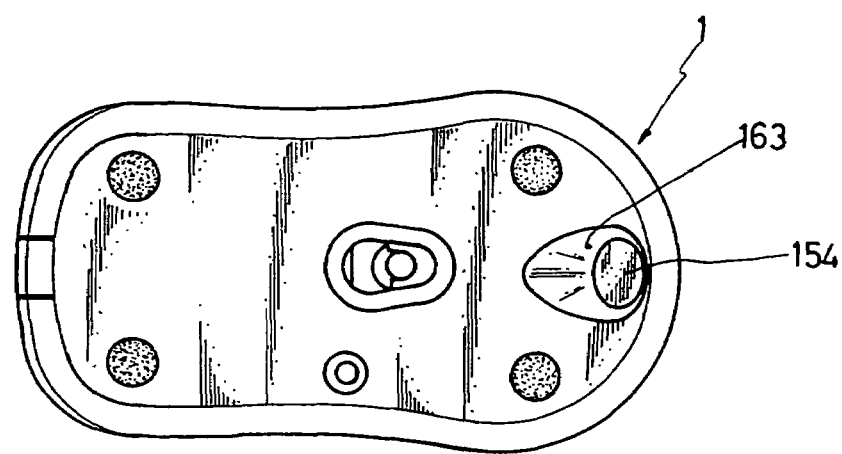
FIG.5

WIRELESS MOUSE HAVING RECEIVER RECEPTACLE

BACKGROUND OF THE INVENTION (a) Technical Field of the Invention

The present invention generally relates to the wireless mouse, and more particularly to a wireless mouse having a receptacle for the storage of its wireless receiver.

(b) Description of the Prior Art

The wireless mouse has become very popular recently as it provides greater freedom to its operation and the user has one less cable to manage. To use a wireless mouse, a wireless receiver has to be installed on the computer so as to receive RF signals emitted from the wireless mouse pertaining to its movement and button status.

The wireless mouse and its wireless receiver are conventionally designed separately; when they are not in use, they are also stored independently, therefore it is not uncommon that the wireless receiver is misplaced or lost. This in some sense compromises the convenience brought forth by the wireless mouse.

SUMMARY OF THE INVENTION

The primary purpose of the present invention is to provide a wireless mouse which has a receptacle for the storage of the wireless receiver when the wireless mouse is not in use, so that the wireless receiver would not be misplaced or lost.

To achieve the foregoing purpose, the present invention provides a receptacle chamber inside the wireless mouse. When the wireless mouse is not in use, the wireless receiver could be inserted into the receptacle chamber. An internal mechanism inside the wireless mouse automatically holds the wireless receiver in its position within the receptacle chamber. To remove the wireless receiver, a release button is engaged and the wireless receiver would be released and ejected out of the receptacle chamber.

The wireless mouse could further be configured with an internal chargeable battery and a jack for the connection with an external power source for recharging the battery.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a sectional view showing the wireless receiver stored inside the wireless mouse according to the present invention.

FIG. 4 is an enlarged top view showing the details of a spring element inside the wireless mouse according to the present invention.

FIG. 5 is a bottom view showing the wireless mouse according to the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
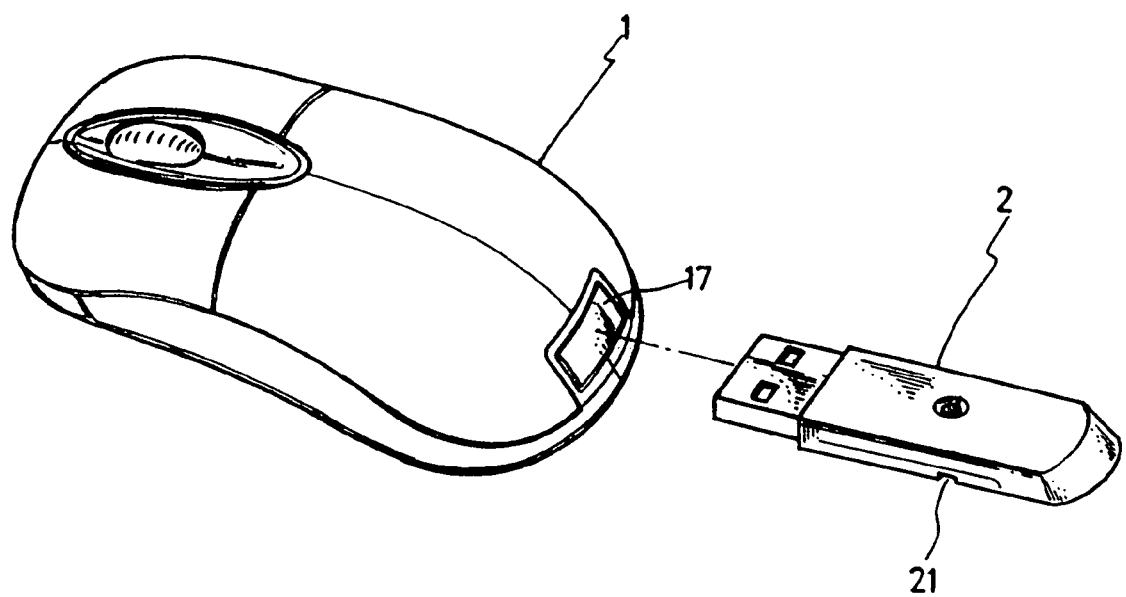
FIG. 1 is a perspective view showing the outlook of a wireless mouse and its wireless receiver according to the present invention.
Figure 2:
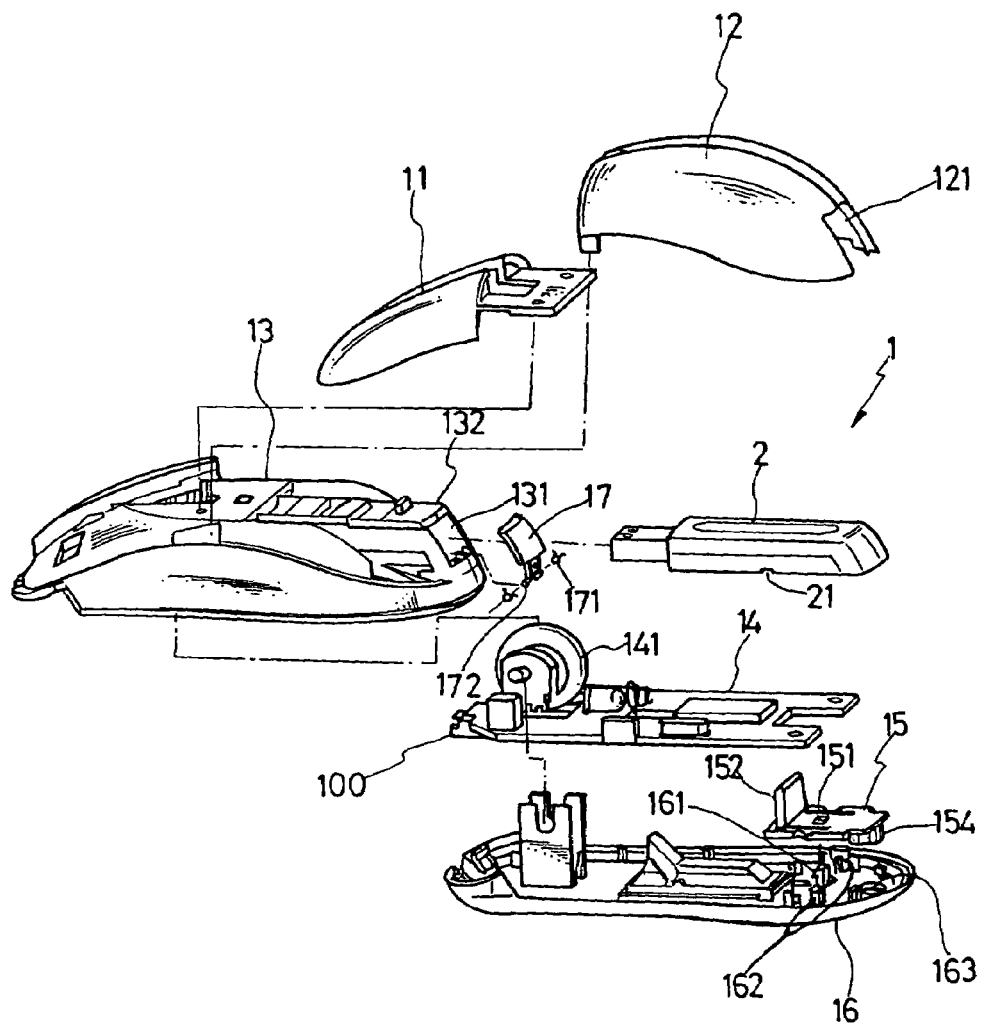
FIG. 2 is a perspective explosion view showing the various components of the wireless mouse according to the present invention.

Please refer to FIG. 1. As illustrated, the present invention mainly involves a wireless mouse 1 and its wireless receiver 2 which could be stored in a receptacle configured on the wireless mouse 1 when the wireless mouse 1 is not in use. As illustrated in FIG. 2, the wireless mouse 1 is composed of a front button cover 11, a rear cover 12, a main body 13, a circuit board 14, a snap-on element 15, and a bottom seat 16. For ease of reference, the direction toward the buttons of the wireless mouse 1 is referred as the front direction and the direction opposite to the buttons is referred to as the rear or back direction hereinafter. The rear cover 12 has a rectangular opening 121 in the rear end to expose an insertion slot 131 of a receptacle chamber 132 configured in the rear section of the main body 13. A door 17 is configured at the insertion slot 131 by a hinge 172 wound with a biasing spring 171 at the bottom of the insertion slot 131, such that, when the wireless receiver 2 is inserted into the receptacle chamber 132 via the insertion slot 131, the door 17 would be pushed open and, when the wireless receiver 2 is removed, the door 17 would return to its original position to close the insertion slot 131 by the biasing spring 171.

As mentioned earlier, the main body 13 has the receptacle chamber 132 configured in the middle of its rear section with the insertion slot 131 at the back end for receiving the wireless receiver 2. The receptacle chamber 132 has a dimension matching that of the wireless receiver 2 so as to accommodate the wireless receiver 2 completely inside. The main body 13 is positioned on top of the circuit board 14 and allows a control wheel 141 of the circuit board 14 exposed to the outside of the main body 13. The circuit board 14 is supported by and fixedly installed on the bottom seat 16. The snap-on element 15 is configured on the bottom seat 16 at a location corresponding to the bottom of the receptacle chamber 132 for the positioning and locking of the wireless receiver 2 inside the receptacle chamber 132.

Please refer to FIG. 3. To store the wireless receiver 2, the wireless receiver 2 is inserted into the receptacle chamber 132 via the insertion slot 131. The door 17 would be forced open and the biasing spring 171 is thereby held in a compressed state under the wireless receiver 2. When the wireless receiver 2 is removed from the receptacle chamber 132, the door 17 would return to its original position to close the insertion slot 131 by the biasing spring 171. Therefore, by examining the state of the door 17, a user can tell whether the wireless receiver 2 is stored in the receptacle chamber 132 or not. When the wireless receiver 2 is inserted into the receptacle chamber 132, the front end of the wireless receiver 2 would press against a spring element 133 and the spring element 133 would remain in a compressed state as the wireless receiver 2 is held in its position in the receptacle chamber 132 by the snap-on element 15. FIG. 4 is an enlarged top view showing the details of the spring element 133. As illustrated, the spring element 133 has an end 134 fixedly attached to a locking element 137 and the other free end 135 for the compression of the wireless receiver 2. As the free end 135 is compressed by the wireless receiver 2 toward the fixed end 134, a resilient force is established against the wireless receiver 2. When the snap-on element 15 releases the wireless receiver 2, the resilient force of the spring element 133 would eject the wireless receiver 2 out of the insertion slot 131 so that a user could easily remove the wireless receiver 2.

Figure 6:
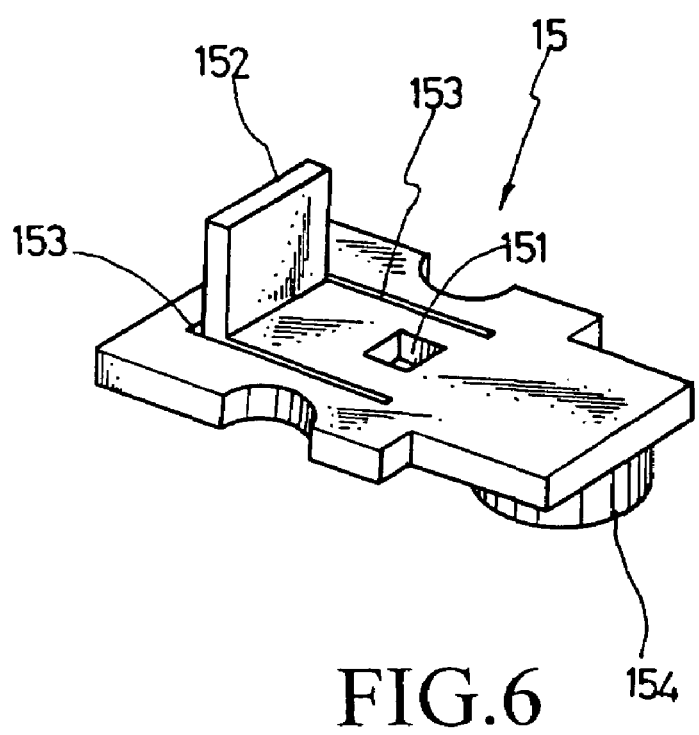
FIG. 6 is a perspective view showing a snap-on element inside the wireless mouse according to the present invention.

Please refer to FIGS. 3 and 6. The bottom seat 16 has a protruding tenon 161 in the rear section of the bottom seat 16 for embedding into a central through opening 151 of the snap-on element 15. In addition, the bottom seat 16 has a pair of positioning pins 162 for holding the snap-on element 15 therebetween. When positioned as such, the snap-on element 15 has its vertical blade 152 extended into the receptacle chamber 132 via a through opening 136 configured at the bottom of the receptacle chamber 132. On the surface of the wireless receiver 2, there is a corresponding groove 21 for the embedding of the vertical blade 152 when the wireless receiver 2 is inserted into the receptacle chamber 132. On the snap-on element 15, the vertical blade 152 is surrounded by a U-shape cutting 153 such that the vertical blade 152 could swing up and down flexibly. Therefore, when the wireless receiver 2 is inserted into the receptacle chamber 132, the vertical blade 152 of the snap-on element 15 is pushed downward until the wireless receiver 2's groove 21 is on top of the vertical blade 152. At that instant, the vertical blade 152 is extended into the groove 21 and thereby positions and locks the wireless receiver 2 inside the receptacle chamber 132. To remove the wireless receiver 2, a release button 154 configured at the bottom of the snap-on element 15 is pressed and, with the protruding tenon 161 as a pivot point, the vertical blade 152 is moved downward to leave the groove 21. Therefore the resilient force of the spring element 133 ejects the wireless receiver 2 out of the receptacle chamber 132. As shown in FIG. 5, the release button 154 is exposed by and hid inside a concaved button groove 163. As such, the release button 154 wouldn't get in the way of wireless mouse 1's sliding operation.

At last, a chargeable battery (not shown) could be installed inside the wireless mouse 1 to provide the required electricity. A jack 100 is provided for connecting the chargeable battery to an external power source via appropriate cabling for recharging.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wireless mouse for a computing device operating along with a wireless receiver detachably installed on said computing device by transmitting RF signals to said wireless receiver, said wireless mouse comprising a front button cover, a rear cover, a main body, a circuit board, a snap-on element, and a bottom seat, wherein said rear cover has a rectangular opening at a rear end to expose an insertion slot of a receptacle chamber configured in a rear section of said main body, a door is configured at said insertion slot by a hinge wound with a biasing spring at a bottom of said insertion slot such that when said wireless receiver is inserted into said receptacle chamber via said insertion slot, said door will be pushed open, and when said wireless receiver is removed, said door will return to original position to close said insertion slot by said biasing spring, said receptacle chamber has a dimension matching dimension of said wireless receiver so as to accommodate said wireless receiver completely inside, said main body is positioned on a top of said circuit board and allows a control wheel of said circuit board exposed to outside of said main body, said circuit board is supported by and fixedly installed on said bottom seat, said snap-on element is configured on said bottom seat at a location corresponding to a bottom of said receptacle chamber for positioning and locking of said wireless receiver inside said receptacle chamber, and when said wireless receiver is inserted into said receptacle chamber, a front end of said wireless receiver will press against a spring element and said spring element will remain in a compressed state as said wireless receiver is held in position in said receptacle chamber by said snap-on element, said spring element has a first end fixedly attached to a locking element and a second end for compression of said wireless receiver, and when said second end is compressed by said wireless receiver toward said first end, a resilient force is established against said wireless receiver, and when said snap-on element releases said wireless receiver, resilient force of said spring element will eject said wireless receiver out of said insertion slot so that a user could easily remove said wireless receiver, said bottom seat has a protruding tenon in a rear section of said bottom seat for embedding into a central through opening of said snap-on element, said bottom seat has a pair of positioning pins for holding said snap-on element therebetween, said snap-on element has a vertical blade extended into said receptacle chamber via a through opening configured at a bottom of said receptacle chamber, a corresponding groove is provided on a surface of said wireless receiver for embedding of said vertical blade when said wireless receiver is inserted into said receptacle chamber, said vertical blade is surrounded by a U-shape cutting such that said vertical blade can swing up and down flexibly, and when said wireless receiver is inserted into said receptacle chamber, said vertical blade of said snap-on element is pushed downward until said groove of said wireless receiver is on a top of said vertical blade, and at that instant, said vertical blade is extended into said groove and thereby positions and locks said wireless receiver inside said receptacle chamber, a release button is configured at a bottom of said snap-on element is pressed and, with a protruding tenon as a pivot point, said vertical blade is moved downward to leave the groove thereby removing said wireless receiver and therefore causing resilient force of said spring element to eject said wireless receiver out of said receptacle chamber, said release button is exposed by and hid inside a concaved button groove so that said release button wouldn't get in way of sliding operation of said wireless mouse, a built-in chargeable battery, and a jack is provided for connecting said chargeable battery to an external power source for recharging.

* * * * *